United States Patent
Zhang et al.

(10) Patent No.: US 11,043,999 B2
(45) Date of Patent: Jun. 22, 2021

(54) WIRELESS COMMUNICATION METHOD AND DEVICE

(71) Applicant: GUANGDONG OPPO MOBILE TELECOMMUNICATIONS CORP., LTD., Guangdong (CN)

(72) Inventors: Zhi Zhang, Dongguan (CN); Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/493,160

(22) PCT Filed: Mar. 17, 2017

(86) PCT No.: PCT/CN2017/077140
§ 371 (c)(1),
(2) Date: Sep. 11, 2019

(87) PCT Pub. No.: WO2018/165985
PCT Pub. Date: Sep. 20, 2018

(65) Prior Publication Data
US 2020/0076491 A1 Mar. 5, 2020

(51) Int. Cl.
*H04B 7/06* (2006.01)
(52) U.S. Cl.
CPC ................... *H04B 7/0632* (2013.01)
(58) Field of Classification Search
CPC .... H04B 7/088; H04B 17/318; H04B 7/0421; H04B 7/0632; H04W 24/10
See application file for complete search history.

(56) References Cited

U.S. PATENT DOCUMENTS

| 2013/0045690 | A1* | 2/2013 | Seol | H04B 7/0628 455/63.4 |
| 2015/0282122 | A1 | 10/2015 | Kim | |
| 2017/0207845 | A1* | 7/2017 | Moon | H04B 7/0695 |

FOREIGN PATENT DOCUMENTS

| CN | 101667900 A | 3/2010 |
| CN | 101978661 A | 2/2011 |

(Continued)

OTHER PUBLICATIONS

International Search Report in the International application No. PCT/CN2017/077140, dated Jun. 26, 2017.

(Continued)

*Primary Examiner* — Janice N Tieu
(74) *Attorney, Agent, or Firm* — Ladas & Parry LLP

(57) ABSTRACT

Provided are a wireless communication method and device. A feedback method for feeding back the signal quality of multiple transmitting beams of a network device by means of a terminal device can be improved, so that the communication performance of the terminal device can be improved. The method comprises: a terminal device determining a first feedback mode for feeding back the signal quality of multiple transmitting beams of a network device, wherein the first feedback mode differs from the other feedback modes supported by the terminal device in at least one of the following aspects: receiving the capability of receiving beams or receiving beam groups for signal quality feedback, and the number of receiving beams or receiving beam groups for signal quality feedback; and the terminal device feeding back the signal quality to the network device according to the first feedback mode.

10 Claims, 5 Drawing Sheets

(56) References Cited

FOREIGN PATENT DOCUMENTS

| | | |
|---|---|---|
| CN | 102111889 A | 6/2011 |
| CN | 106160807 A | 11/2016 |
| CN | 106470062 A | 3/2017 |
| RU | 2015106981 A | 9/2016 |
| WO | 2015147546 A1 | 10/2015 |

OTHER PUBLICATIONS

Written Opinion of the International Search Authority in the international application No. PCT/CN2017/077140, dated Jun. 26, 2017.
First Office Action of the Chinese application No. 201780087046.3, dated Jun. 28, 2020.
Second Office Acton of the Chinese application No. 201780087046.3, dated Aug. 5, 2020.
First Office Action of the Russian application No. 2019132690, dated Jun. 17, 2020.
Samsung, UE Rx beam set for team measurement and reporting, 3GPP TSG RAN WG1#88 (R1-1702933) Athens, Greece, Jul. 2, 2017, (found on Jun. 15, 2020), found in the Internet at: https://www.3gpp.org/DynaReport/TDocExMtg-R1-88-17053.htm.
Supplementary European Search Report in corresponding European application No. 17901106.9, dated Jan. 30, 2020.
English translation of the Written Opinion of the International Search Authority in corresponding international application No. PCT/CN2017/077140, dated Jun. 26, 2017.
First Office Action of the European application No. 17901106.9, dated Oct. 1, 2020.
First Office Action of the Canadian application No. 3056007, dated Oct. 19, 2020.
Written Opinion of the Singaporean application No. 11201908586R, dated Nov. 25, 2020.
First Office Action of the Indian application No. 201917040431, dated Feb. 3, 2021.

* cited by examiner

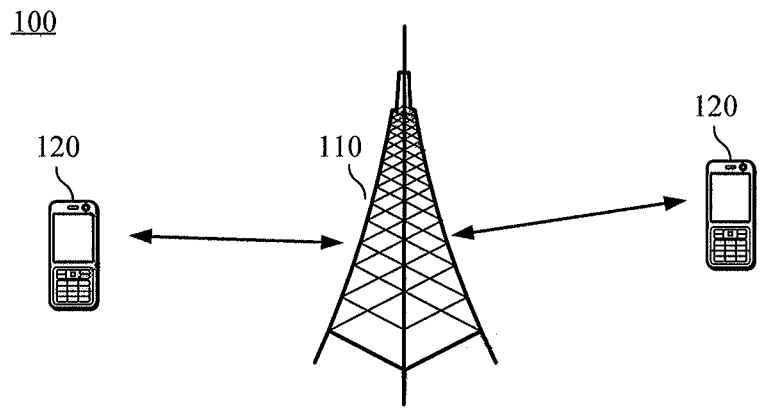

A terminal device determines a first feedback manner for feeding back signal quality of multiple transmit beams of a network device, and the first feedback manner is different from another feedback manner supported by the terminal device in at least one of: a receiving capability of receive beams or receive beam groups configured for signal quality feedback or the number of the receive beams or receive beam groups configured for signal quality feedback — 210

The terminal device feeds back the signal quality to the network device according to the first feedback manner — 220

A network device generates first information, and the first information is used to configure a feedback manner in which a terminal device feeds back signal quality of multiple transmit beams of the network device to the network device; the first information is used to configure at least one of the followings for the terminal device: a receiving capability of receive beams or receive beam groups configured for signal quality feedback, the number of the receive beams or receive beam groups configured for signal quality feedback, or a composition manner of the receive beams or receive beam groups configured for signal quality feedback, the composition manner being indexed to the number of the receive beam or receive beam groups configured for signal quality feedback  310

The network device sends the first information to the terminal device  320

FIG. 5

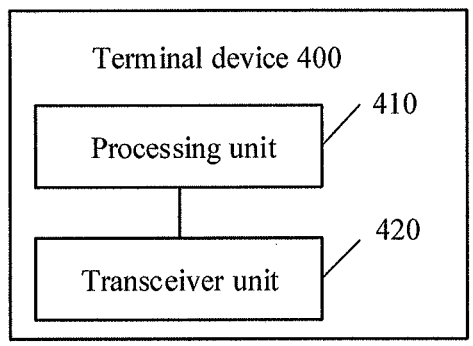

FIG. 6

WIRELESS COMMUNICATION METHOD AND DEVICE

RELATED APPLICATION

This application is an application under 35 U.S.C. 371 of International Application No. PCT/CN2017/077140 filed on Mar. 17, 2017, the entire contents of which are incorporated herein by reference.

TECHNICAL FIELD

The disclosure relates to the field of communication, and more particularly to a wireless communication method and a device.

BACKGROUND

A terminal device may measure, by use of multiple receive beams, measurement signals sent by a network device through multiple transmit beams, and select at least one transmit beam and the matched receive beam based on a measurement result. A measurement report is reported to the terminal device, and the measurement report includes the at least one transmit beam and matched receive beam selected by the terminal device.

Therefore, the network device may send a downlink signal to the terminal device by use of the at least one transmit beam selected by the terminal device, and the terminal device may adopt the matched receiving beam to receive the downlink signal sent through the at least one transmit beam.

Compared with a Long Term Evolution (LTE) system, a terminal device in a 5th-Generation (5G) communication system has a higher requirement on the communication performance. The communication performance of the terminal device may be improved by improving a feedback method for feeding back signal quality of multiple transmit beams of a network device by the terminal device.

SUMMARY

The disclosure provides a wireless communication method and a device, which is capable of improving the feedback method for feeding back signal quality of multiple transmit beams of a network device by a terminal device, thereby improving communication performance of the terminal device.

A first aspect provides a wireless communication method, which may include the following operations.

A terminal device determines a first feedback manner for feeding back signal quality of multiple transmit beams of a network device. The first feedback manner is different from another feedback manner supported by the terminal device in at least one of: a receiving capability of receive beams or receive beam groups configured for signal quality feedback, or the number of the receive beams or receive beam groups configured for signal quality feedback.

The terminal device feeds back the signal quality to the network device according to the first feedback manner.

In combination with the first aspect, in a possible implementation mode thereof, the receiving capability of the receive beams or the receive beam groups may include at least one of a first receiving capability or a second receiving capacity.

In the first receiving capability, the same receive beam or the same receive beam group may be capable of simultaneously receiving downlink signals sent by multiple transmit beams.

In the second receiving capability, different receive beams or different receive beam groups may be capable of simultaneously receiving downlink signals sent by different transmit beams.

In combination with the first aspect, in a possible implementation mode thereof, the receiving capability of the receive beams or the receive beam groups may include at least one of a first receiving capability or a second receiving capacity.

In the first receiving capability, the same receive beam or the same receive beam group may be capable of simultaneously receiving downlink signals sent by multiple transmit beams corresponding to the receive beam or the receive beam group.

In the second receiving capability, different receive beams or different receive beam groups may be capable of simultaneously receiving downlink signals sent by different transmit beams corresponding to the respective receive beams or receive beam groups.

In combination with the first aspect, in a possible implementation mode thereof, the receiving capability of the receive beams or the receive beam groups may include at least one of a first receiving capability or a second receiving capacity.

In the first receiving capability, the same receive beam or the same receive beam group may be capable of simultaneously receiving downlink signals sent by multiple transmit beams matched with the receive beam or the receive beam group.

In the second receiving capability, different receive beams or different receive beam groups may be capable of simultaneously receiving downlink signals sent by different transmit beams matched with the respective receive beams or receive beam groups.

In combination with the first aspect or any abovementioned possible implementation mode thereof, in another possible implementation mode thereof, the method may further include the following operation.

The terminal device receives first information sent by the network device. The first information may be used to configure at least one of the followings for the terminal device: the receiving capability of the receive beams or receive beam groups configured for signal quality feedback, the number of the receive beams or receive beam groups configured for signal quality feedback, or a composition manner of the receive beams or receive beam groups configured for signal quality feedback. The composition manner may be indexed to the number of the receive beam or receive beam groups configured for signal quality feedback.

The operation that the terminal device determines the first feedback manner for feeding back the signal quality of the multiple transmit beams of the network device may include the following action.

The terminal device determines the first feedback manner according to the first information.

In combination with the first aspect or any abovementioned possible implementation mode thereof, in another possible implementation mode thereof, before the operation that the terminal device determines the first feedback manner for feeding back the signal quality of the multiple transmit beams of the network device, the method may further include the following operation.

The terminal device sends second information to the network device. The second information may be configured to indicate at least one of: receiving capabilities of receive beams or receive beam groups supported by the terminal device, the number of the receive beams or the receive beam groups supported by the terminal device, composition manners of the receive beams or the receive beam groups supported by the terminal device, or the number of the composition manners of the receive beams or the receive beam groups supported by the terminal device. Each composition manner may be indexed to the number of the receive beams or receive beam groups configured for signal quality feedback.

In combination with the first aspect or any abovementioned possible implementation mode thereof, in another possible implementation mode thereof, when the terminal device supports at least two receiving capabilities of the receive beams or the receive beam groups, the second information may at least indicate the receiving capabilities of the receive beams or the receive beam groups supported by the terminal device.

The method may further include the following operation.

The terminal device receives third information sent by the network device. The third information may be used to at least configure the following for the terminal device: the receiving capability of the receive beams or receive beam groups configured for signal quality feedback.

The operation that the terminal device determines the first feedback manner for feeding back the signal quality of the multiple transmit beams of the network device may include the following action.

The terminal device determines the first feedback manner according to the third information.

In combination with the first aspect or any abovementioned possible implementation mode thereof, in another possible implementation mode thereof, when the terminal device supports at least two composition manners of the receive beams or the receive beam groups, the second information may indicate at least one of the followings: the composition manners of the receive beams or the receive beam groups supported by the terminal device, the number of the receive beams or the receive beam groups supported by the terminal device, or the number of the composition manners of the receive beams or the receive beam groups supported by the terminal device.

The method may further include the following operation.

The terminal device receives fourth information sent by the network device. The fourth information may be used to configure at least one of the followings for the terminal device: the composition manner of the receive beams or receive beam groups configured for the signal quality feedback, the number of the composition manners of the receive beams or the receive beam groups supported by the terminal device, or the number of the receive beams or receive beam groups configured for quality feedback.

The operation that the terminal device determines the first feedback manner for feeding back the signal quality of the multiple transmit beams of the network device may include the following action.

The terminal device determines the first feedback manner according to the fourth information.

In combination with the first aspect or any abovementioned possible implementation mode thereof, in another possible implementation mode thereof, when the terminal device supports one receiving capability of the receive beams or the receive beam groups and the terminal device supports one composition manner of the receive beams or the receive beam groups, the operation that the terminal device determines the first feedback manner for feeding back the signal quality of the multiple transmit beams of the network device may include the following action.

The terminal device determines the first feedback manner according to the second information.

In combination with the first aspect or any abovementioned possible implementation mode thereof, in another possible implementation mode thereof, the second information may indicate at least one of: the composition manners of the receive beams or the receive beam groups supported by the terminal device, the number of the receive beams or the receive beam groups supported by the terminal device, or the number of the composition manners of the receive beams or the receive beam groups supported by the terminal device.

A measurement report for feeding back the signal quality may further be configured to indicate the receiving capabilities of the receive beams or the receive beam groups supported by the terminal device.

In combination with the first aspect or any abovementioned possible implementation mode thereof, in another possible implementation mode thereof, the operation that the terminal device sends the second information to the network device may include the following action.

The terminal device sends a message carrying capability information of the terminal device to the network device, and the capability information includes the second information.

A second aspect provides a wireless communication method, which may include the following operations.

A network device generates first information, and the first information is used to configure a feedback manner in which a terminal device feeds back signal quality of multiple transmit beams of the network device to the network device. The first information is used to configure at least one of the followings for the terminal device: a receiving capability of receive beams or receive beam groups configured for signal quality feedback, the number of the receive beams or receive beam groups configured for signal quality feedback, or a composition manner of the receive beams or receive beam groups configured for signal quality feedback. The composition manner is indexed to the number of the receive beam or receive beam groups configured for signal quality feedback.

The network device sends the first information to the terminal device.

In combination with the second aspect, in a possible implementation mode thereof, the receiving capability of the receive beams or the receive beam groups may include at least one of a first receiving capability or a second receiving capacity.

In the first receiving capability, the same receive beam or the same receive beam group may be capable of simultaneously receiving downlink signals sent by multiple transmit beams.

In the second receiving capability, different receive beams or different receive beam groups may be capable of simultaneously receiving downlink signals sent by different transmit beams.

In combination with the second aspect or any abovementioned possible implementation mode thereof, in another possible implementation mode thereof, before the operation that the network device generates the first information, the method may further include the following operation.

The network device receives second information sent by the terminal device. The second information is configured to indicate at least one of: receiving capabilities of receive beams or receive beam groups supported by the terminal device, the number of the receive beams or the receive beam groups supported by the terminal device, composition manners of the receive beams or the receive beam groups supported by the terminal device, or the number of the composition manners of the receive beams or the receive beam groups supported by the terminal device.

In combination with the second aspect or any abovementioned possible implementation mode thereof, in another possible implementation mode thereof, the second information may at least indicate the receiving capabilities of the receive beams or the receive beam groups supported by the terminal device, and the receiving capabilities of the receive beams or the receive beam groups supported by the terminal device may include at least two receiving capabilities.

The first information may be used to at least configure the following for the terminal device: the receiving capability of the receive beams or receive beam groups configured for signal quality feedback.

In combination with the second aspect or any abovementioned possible implementation mode thereof, in another possible implementation mode thereof, the composition manners of the receive beams or the receive beam groups supported by the terminal device may include at least two composition manners, and the second information may indicate at least one of the followings: the composition manners of the receive beams or the receive beam groups supported by the terminal device, the number of the receive beams or the receive beam groups supported by the terminal device, or the number of the composition manners of the receive beams or the receive beam groups supported by the terminal device.

The first information may be used to configure at least one of the followings for the terminal device: the composition manner of the receive beams configured for the signal quality feedback, the number of the composition manners of the receive beams or the receive beam groups supported by the terminal device, or the number of the receive beams or receive beam groups configured for quality feedback.

In combination with the second aspect or any abovementioned possible implementation mode thereof, in another possible implementation mode thereof, the second information may indicate at least one of: the composition manners of the receive beams or the receive beam groups supported by the terminal device, the number of the receive beams or the receive beam groups supported by the terminal device, or the number of the composition manners of the receive beams or the receive beam groups supported by the terminal device.

A measurement report for feeding back the signal quality may further be configured to indicate the receiving capabilities of the receive beams or the receive beam groups supported by the terminal device.

In combination with the second aspect or any abovementioned possible implementation mode thereof, in another possible implementation mode thereof, the operation that the network device receives the second information sent by the terminal device may include the following action.

The network device receives a message carrying capability information of the terminal device from the terminal device. The capability information may include the second information.

In combination with the second aspect or any abovementioned possible implementation mode thereof, in another possible implementation mode thereof, the method may further include the following operations.

The network device determines a first feedback manner for signal quality feedback of the terminal device. The first feedback manner is different from another feedback manner supported by the terminal device in at least one of: the receiving capability of the receive beams or receive beam groups configured for the signal quality feedback, or the number of the receive beams or receive beam groups configured for the signal quality feedback.

The network device determines a transmit beam for sending a downlink signal to the terminal device according to the first feedback manner and the fed-back measurement report for the signal quality.

The network device sends the downlink signal via the determined transmit beam.

A third aspect provides a terminal device. The terminal device may include units configured to implement the method in the first aspect or any possible implementation mode thereof.

A fourth aspect provides a network device. The network device may include units configured to implement the method in the second aspect or any possible implementation mode thereof.

A fifth aspect provides a terminal device, which may include a memory and a processor. The memory stores an instruction, and the processor is configured to call the instruction stored in the memory to execute the method in the first aspect or any optional implementation mode thereof.

A sixth aspect provides a network device, which may include a memory and a processor. The memory stores an instruction, and the processor is configured to call the instruction stored in the memory to execute the method in the second aspect or any optional implementation mode thereof.

A seventh aspect provides a computer-readable medium, which stores a program code configured to be executed by a terminal device. The program code includes an instruction configured to execute the method in the first aspect or each implementation mode thereof or includes an instruction configured to execute the method in the second aspect or each implementation mode thereof.

An eighth aspect provides a system chip, which includes an input interface, an output interface, a processor and a memory. The processor is configured to execute a code in the memory. When the code is executed, the processor may implement the method in the first aspect and each implementation mode or execute the method in the second aspect and each implementation mode.

In the embodiments of the disclosure, the terminal device may determine the first feedback manner for feeding back the signal quality of the multiple transmit beams of the network device from multiple feedback manners, and the terminal device feeds back the signal quality to the network device according to the first feedback manner. In such a manner, the terminal device may support the multiple feedback manners, and the terminal device may select a presently-used feedback manner in the multiple feedback manners according to a requirement. Therefore, communication performance of the terminal device may be improved.

BRIEF DESCRIPTION OF DRAWINGS

In order to describe the technical solutions of the embodiments of the disclosure more clearly, the drawings required to be used in descriptions about the embodiments or a conventional art will be simply introduced below. It is apparent that the drawings described below are only some embodiments of the disclosure. Other drawings may further be obtained by those of ordinary skill in the art according to these drawings without creative work.

FIG. 1 is a schematic diagram of a wireless communication system according to an embodiment of the disclosure.

FIG. 2 is a schematic flowchart of a wireless communication method according to an embodiment of the disclosure.

FIG. 5 is a schematic flowchart of a wireless communication method according to an embodiment of the disclosure.

FIG. 6 is a schematic block diagram of a terminal device according to an embodiment of the disclosure.

DETAILED DESCRIPTION

Figure 3:
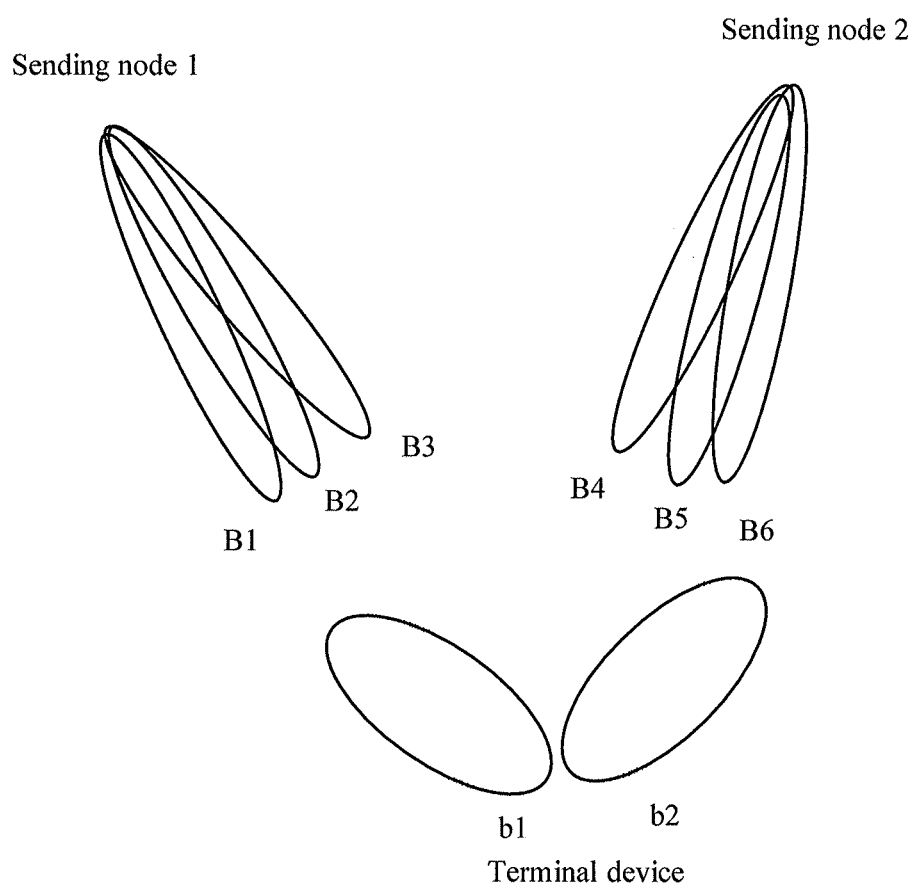
FIG. 3 is a matching schematic diagram of transmit beams and receive beams according to an embodiment of the disclosure.

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art on the basis of the embodiments in the disclosure without creative work shall fall within the scope of protection of the disclosure.

The technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), an LTE system, an LTE Frequency Division Duplex (FDD) system, an LTE Time Division Duplex (TDD), a Universal Mobile Telecommunication System (UMTS), a Worldwide Interoperability for Microwave Access (WiMAX) communication system or a future 5G system.

FIG. 1 illustrates a wireless communication system 100 to which the embodiments of the disclosure are applied. The wireless communication system 100 may include a network device 110. The network device 100 may be a device communicating with a terminal device. The network device 100 may provide communication coverage for a specific geographical region and may communicate with a terminal device (for example, User Equipment (UE)) in the coverage. In at least one example, the network device 100 may be a Base Transceiver Station (BTS) in the GSM or the CDMA system, may also be a NodeB (NB) in the WCDMA system, and may further be an Evolutional Node B (eNB or eNodeB) in the LTE system or a wireless controller in a Cloud Radio Access Network (CRAN). In another example, the network device may be a relay station, an access point, a vehicle-mounted device, a wearable device, a network-side device in a future 5G network, a network device in a future evolved Public Land Mobile Network (PLMN) or the like.

The wireless communication system 100 further includes at least one terminal device 120 within the coverage of the network device 110. The terminal device 120 may be mobile or fixed. In at least one example, the terminal device 120 may be an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in the future 5G network, a terminal device in the future evolved PLMN or the like.

In at least one example, the terminal devices 120 may perform Device to Device (D2D) communication.

In at least one example, the 5G system or network may also be called a New Radio (NR) system or network.

A network device and two terminal devices are exemplarily illustrated in FIG. 1. In at least one embodiment, the wireless communication system 100 may include multiple network devices and another number of terminal devices may be included in coverage of each network device. There are no limits made thereto in the embodiments of the application.

In at least one embodiment, the wireless communication system 100 may further include another network entity such as a network controller and a mobility management entity. There are no limits made thereto in the embodiments of the disclosure.

It is to be understood that terms "system" and "network" in the disclosure may usually be exchanged. In the disclosure, the term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

It is to be understood that a beam or beam group mentioned in the embodiments of the disclosure may also be called a port, and an identifier of the beam or the beam group may be an identifier of a reference signal received or sent on the beam.

FIG. 2 is a schematic flowchart of a signal transmission method 200 according to an embodiment of the disclosure. The method 200 may be applied, but not limited, to the system illustrated in FIG. 1. As illustrated in FIG. 2, the method 200 includes the following contents.

In 210, a terminal device determines a first feedback manner for feeding back signal quality of multiple transmit beams of a network device, and the first feedback manner is different from another feedback manner supported by the terminal device in at least one of: a receiving capability of receive beams or receive beam groups configured for signal quality feedback or the number of the receive beams or receive beam groups configured for signal quality feedback.

It is to be understood that the signal quality feedback mentioned in the embodiment of the disclosure may include a signal measurement process and/or a measurement report process.

In at least one embodiment, the receiving capability of the receive beams or the receive beam groups includes a first receiving capability and a second receiving capability. In the first receiving capability, the same receive beam or the same receive beam group may simultaneously receive downlink signals sent by multiple transmit beams. In at least one embodiment, the multiple transmit beams are at least part of transmit beams matched with the same receive beam or receive beam group in a measurement report.

In at least one embodiment, in the second receiving capability, different receive beams or different receive beam groups may simultaneously receive downlink signals sent by different transmit beams.

In at least one embodiment, each receive beam in different receive beams receives downlink signals sent by at least part of transmit beams matched with the receive beam in the measurement report.

In at least one embodiment, the same antenna panel may correspond to multiple receive beams or receive beam groups with the first receiving capability.

In at least one embodiment, a receive beam or receive beam group with the second receiving capability may correspond to at least one antenna panel. Antenna panels corresponding to multiple receive beams or receive beam groups with the second receiving capability are not overlapped.

For conveniently understanding the first receiving beam and the second receiving capability, detailed descriptions will be made below in combination with FIG. 3 and FIG. 4.

As illustrated in FIG. 3, the network device may send downlink signals to the terminal device through a transmit beam B1, transmit beam B2 and transmit beam B3 of a sending node 1, and may send downlink signals to the terminal device through a transmit beam B4, transmit beam B5 and transmit beam B6 of a sending node 2. The terminal device may receive the downlink signals sent by the network device through two receive beams, i.e., a receive beam b1 and a receive beam b2.

The network device may send downlink measurement signals to the terminal device through the transmit beam B1, the transmit beam B2, the transmit beam B3, the transmit beam B4, the transmit beam B5 and the transmit beam B6. The terminal device may measure the downlink signals sent by each transmit beam using the receive beams b1 and b2 to obtain a measurement result. The terminal device may select a transmit beam according to the measurement result.

For example, the measurement result may be illustrated as follows. Assume that the measurement result is Reference Signal Received Power (RSRP), and beam pairs which are not listed may be considered to have particularly low signal strength and may be ignored.

| [B1 b1] −60 dB | [B1 b2] −120 dB |
| [B2 b1] −70 dB | [B2 b2] −120 dB |
| [B3 b1] −100 dB | [B3 b2] −120 dB |
| [B4 b1] −120 dB | [B4 b2] −100 dB |
| [B5 b1] −120 dB | [B5 b2] −65 dB |
| [B6 b1] −120 dB | [B6 b2] −75 dB |

If four transmit beams are to be reported, multiple beam pairs may be selected from the result, and the selected beam pairs and the corresponding measurement result may be reported.

Beam pairs [B1 b1], [B2 b1], [B5 b2] and [B6 b2] correspond to optimal signal quality, and then the four beam pairs may be reported. In the reporting process, a receive beam identifier corresponding to each receive beam may be reported. That is, a reporting manner for the measurement result may be illustrated as follows.

[B1 b1]-60 dB
[B2 b1]-70 dB
[B5 b2]-65 dB
[B6 b2]-75 dB

When the network device receives the measurement result, it may be learned about that the same receive beam may simultaneously receive signals sent by different transmit beams. That is, the network device may simultaneously send the downlink signals to the terminal device through B1 and B2 or B5 and B6.

Figure 4:
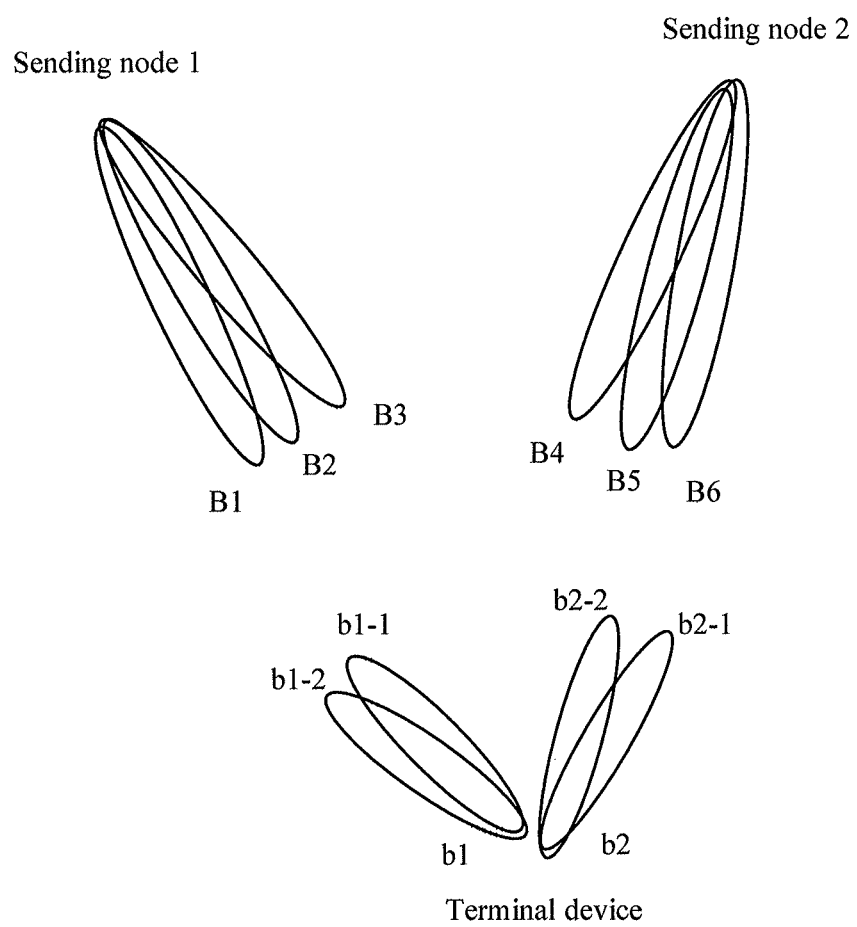
FIG. 4 is a matching schematic diagram of transmit beams and receive beams according to an embodiment of the disclosure.

As illustrated in FIG. 4, the network device may send downlink signals to the terminal device through the transmit beam B1, transmit beam B2 and transmit beam B3 of the sending node 1, and may send downlink signals to the terminal device through the transmit beam B4, transmit beam B5 and transmit beam B6 of the sending node 2. The terminal device may include two receive beam groups, i.e., a receive beam group b1 and a receive beam group b2. The receive beam group b1 may include receive beams b1-1 and b1-2, and the receive beam group b2 may include receive beams b2-1 and b2-2.

The network device may send downlink measurement signals to the terminal device through the transmit beam B1, the transmit beam B2, the transmit beam B3, the transmit beam B4, the transmit beam B5 and the transmit beam B6. The terminal device may measure the downlink signals sent by each transmit beam using the receive beams b1-1, b1-2, b2-1 and b2-2 to obtain a measurement result. The terminal device may select a transmit beam according to the measurement result.

For example, the measurement report may be illustrated as follows. Assume that the measurement result is RSRP, and beam pairs which are not listed may be considered to have particularly low signal strength and may be ignored.

| [B1 b1-1] −60 dB | [B1 b1-2] −120 dB |
| [B2 b1-1] −70 dB | [B2 b1-2] −120 dB |
| [B3 b1-1] −100 dB | [B3 b1-2] −120 dB |
| [B4 b2-1] −120 dB | [B4 b2-2] −100 dB |
| [B5 b2-1] −120 dB | [B5 b2-2] −65 dB |
| [B6 b2-1] −120 dB | [B6 b2-2] −75 dB |

If four transmit beams are to be reported, multiple beam pairs may be selected from the result, and the selected beam pairs and the corresponding measurement result may be reported.

Beam pairs [B1 b1-1], [B2 b1-1], [B5 b2-2] and [B6 b2-2] correspond to optimal signal quality, and then the four beam pairs may be reported. In the reporting process, a receive beam group identifier corresponding to each receive beam may be reported. That is, a reporting manner for the measurement result may be illustrated as follows.

[B1 b1]-60 dB
[B2 b1]-70 dB
[B5 b2]-65 dB
[B6 b2]-75 dB

When the network device receives the measurement result, it may be learned about that different receive beam groups may simultaneously receive signals sent by different transmit beams. That is, the network device may simultaneously send the downlink signals to the terminal device through B1 and B5, or B1 and B6, or B2 and B5, or B2 and B6.

In the embodiment of the disclosure, the receive beam or the receive beam group is represented by an identifier in a communication process.

Although the receive beams illustrated in FIG. 3 have the first receiving capability and the receive beam groups illustrated in FIG. 4 have the second receiving capability, this does not mean that all of the receive beams in the embodiment of the disclosure have the first receiving capability and all of second receive beams have the second receiving capability, that is, the names of the receive beams and receive beam groups in the embodiment of the disclosure are not distinguished by the receiving capability.

The receive beam in the embodiment of the disclosure may also be called a receive beam group or a receive beam unit. Similarly, the receive beam group in the embodiment of the disclosure may also be called a receive beam or a receive beam unit.

In at least one embodiment, the number of the receive beams or receive beam groups configured for signal quality feedback may be the number of receive beams or receive beam groups adopted in the signal measurement process.

In at least one embodiment, the number of the receive beams or receive beam groups configured for signal quality feedback may be the number of receive beams or receive beam groups reported in the measurement report.

The number of the receive beams or receive beam groups adopted in the signal measurement process may be different from the number of the receive beams or receive beam groups reported in the measurement report.

For example, when it is found in the signal measurement process that quality of signals between one or more receive beams or one or more receive beam groups and any transmit beam does not meet a reporting condition, the number of the receive beams or receive beam groups adopted in the signal measurement process is greater than the number of the receive beams or receive beam groups reported in the measurement report.

In at least one embodiment of the disclosure, the terminal device receives first information sent by the network device. The first information is used to configure the terminal device about at least one of: the receiving capability of the receive beams or receive beam groups configured for signal quality feedback, the number of the receive beams or receive beam groups configured for signal quality feedback or a composition manner of the receive beams or receive beam groups configured for signal quality feedback. The composition manner is indexed to the number of the receive beam or receive beam groups configured for signal quality feedback.

The terminal device determines the first feedback manner according to the first information.

Specifically, when the network device configures the receiving capability of the receive beams or receive beam groups for signal quality feedback of the terminal device, the terminal device may select a receive beam or receive beam group for signal measurement and/or select a reporting manner for the measurement report according to this configuration.

For example, when the network device configures the first receiving capability for the terminal device, the terminal device may, as illustrated in FIG. 3, receive the downlink signals sent by each transmit beam of the network device using the receive beam b1 and the receive beam b2 respectively and select one or more beam pairs to be reported according to the signal quality of the received downlink signals. The measurement report includes information of the selected beam pair and identifiers of the receive beams in the beam pair are identifiers of b1 and b2.

For example, when the network device configures the first receiving capability for the terminal device, the terminal device may, as illustrated in FIG. 4, receive the downlink signals sent by each transmit beam of the network device using the receive beam b1-1, the receive beam b1-2, the receive beam b2-1 and the receive beam b2-1 respectively and select one or more beam pairs to be reported according to the signal quality of the received downlink signals. The measurement report includes information of the selected beam pairs and identifiers of the receive beams in the beam pairs are respective identifiers of the receive beam b1-1, the receive beam b1-2, the receive beam b2-1 and the receive beam b2-1.

For example, when the network device configures the second receiving capability for the terminal device, the terminal device may, as illustrated in FIG. 4, receive the downlink signals sent by each transmit beam of the network device using the receive beam b1-1, the receive beam b1-2, the receive beam b2-1 and the receive beam b2-1 respectively and select one or more beam pairs to be reported according to the signal quality of the received downlink signals. The measurement report contains information of the selected beam pairs and identifiers of the receive beams in the beam pairs are identifiers of the receive beam group b1 and the receive beam group b2.

In at least one embodiment, when the network device configures the number of the receive beams or receive beam groups, configured for signal quality feedback, of the terminal device, the terminal device may determine the number of the receive beams or receive beam groups configured for signal quality feedback according to this configuration.

In at least one embodiment, the terminal device sends second information to the network device, and the second information is configured to indicate at least one of: receiving capabilities of receive beams or receive beam groups supported by the terminal device, a number of the receive beams or the receive beam groups supported by the terminal device, composition manners of the receive beams or the receive beam groups supported by the terminal device, or the number of the composition manners of the receive beams or the receive beam groups supported by the terminal device. Each composition manner is indexed to the number of the receive beams or receive beam groups configured for signal quality feedback.

In at least one embodiment, the receiving capabilities of the receive beams or receive beam groups supported by the terminal device may include the first receiving capability and the second receiving capability.

In at least one embodiment, the number of the receive beams or the receive beam groups supported by the terminal device may be more than one, and in such a condition, the terminal device supports multiple composition manners for the receive beams or the receive beam groups. The terminal device may contain the number of the receive beams or the receive beam groups supported by the terminal device in the second information, or may also contain an identifier of the composition manner corresponding to the number in the second information.

In at least one embodiment, the terminal device sends a message carrying capability information of the terminal device to the network device, and the capability information includes the second information. In another embodiment, the terminal device may report the second information at another moment in a Radio Resource Control (RRC) connected state.

In at least one embodiment of the disclosure, the terminal device may send the second information to the network device according to an existing configuration, a capability of the terminal device and a service requirement of the terminal device.

In at least one embodiment of the disclosure, the network device may configure the terminal device according to the second information reported by the terminal device.

In an implementation, when the terminal device supports at least two receiving capabilities of the receive beams or the receive beam groups, the second information at least indicates the receiving capabilities of the receive beams or the receive beam groups supported by the terminal device. The terminal device receives third information sent by the network device, and the third information is used to at least configure the following for the terminal device: the receiving capability of the receive beams or receive beam groups configured for signal quality feedback. The terminal device determines the first feedback manner according to the third information.

Specifically, the terminal device reports K conditions supported by the terminal device for the receive beams or the receive beam groups to the network device. Each condition at least includes the receiving capability of the receive beams or the receive beam groups.

Further, related report information of each condition may further include part or all of the following information:

the composition manner of the receive beams or the receive beam groups; and the number of the receive beams or the receive beam groups.

The network device, after receiving information reported by the terminal device, may configure the terminal device. Configuration information may include:

a serial number (k) of one of the K conditions; or the receiving capability of the receive beams or the receive beam groups and the number of the receive beams or the receive beam groups; or the capability of the receive beams or the receive beam groups and a serial number of the composition manner for the receive beams or the receive beam groups.

The terminal device, after the configuration information of the network device is received and the configuration is activated, may perform signal measurement and report the measurement report according to the configuration information.

For understanding this implementation more clearly, detailed descriptions will be made below with example A and example B.

EXAMPLE A

The terminal device supports two receiving capabilities, the terminal device supports one composition manner for the receive beams or the receive beam groups and the number of the receive beams or the receive beam groups in the composition manner is 2.

There are two conditions supported by the terminal device for the receive beams or the receive beam groups.

Condition 1: the supported receiving capability is a receiving capability 1, and in the receiving capability 1, one composition manner for the receive beams or the receive beam groups is supported, that is, two receive beams or receive beam groups are included.

Condition 2: the supported receiving capability is a receiving capability 2, and in the receiving capability 2, one composition manner for the receive beams or the receive beam groups is supported, that is, two receive beams or receive beam groups are included.

The network device, after receiving the information reported by the terminal device, may configure the terminal device. The configuration information may include: the receiving capability 1 and the number of the receive beams or the receive beam groups being 2; or Condition 1; or the receiving capability 1 and a serial number of the composition manner of the receive beams or the receive beam groups.

EXAMPLE B

The terminal device supports two receiving capabilities. The terminal device supports two composition manners for the receive beams or the receive beam groups and the number of the receive beams or the receive beam groups in the two composition manners is 2 or 4.

There are two conditions supported by the terminal device for the receive beams or the receive beam groups.

Condition 1: the supported receiving capability is a receiving capability 1, and in the receiving capability 1, two composition manners for the receive beams or the receive beam groups are supported, that is, two receive beams or receive beam groups are supported and four receive beams or receive beam groups are supported.

Condition 2: in a receiving capability 2, one composition manner for the receive beams or the receive beam groups is supported, that is, two receive beams or receive beam groups are included.

The network device, after receiving the information reported by the terminal device, may configure the terminal device. The configuration information may include: the receiving capability 1 and the number of the receive beams or the receive beam groups being 2; or Condition 1; or the receiving capability 1 and a serial number of the composition manner of the receive beams or the receive beam groups.

EXAMPLE C

The terminal device supports two receiving capabilities. The terminal device supports two composition manners for the receive beams or the receive beam groups and the number of the receive beams or the receive beam groups in the two composition manners is 2 or 4.

There are three conditions supported by the terminal device for the receive beams or the receive beam groups.

Condition 1: the supported receiving capability is a receiving capability 1, and one composition manner for the receive beams or the receive beam groups is supported in the receiving capability 1, that is, two receive beams or receive beam groups are supported.

Condition 2: the supported receiving capability is the receiving capability 1, and one composition manner for the receive beams or the receive beam groups is supported in the receiving capability 1, that is, four receive beams or receive beam groups are supported.

Condition 3: in a receiving capability 2, one composition manner for the receive beams or the receive beam groups is supported, that is, two receive beams or receive beam groups are included.

The network device, after receiving the information reported by the terminal device, may configure the terminal device. The configuration information may include: Condition 2; or the receiving capability 1 and the number of the receive beams or the receive beam groups being 4.

It is to be understood that, in example B and example C, the receiving capability of the receive beams or the receive beam groups supported by the terminal device, the supported composition manner of the receive beams or the receive beam groups and the supported number of the receive beams or the receive beam groups are the same and a substantial association among them is the same. However, different numbers of conditions are divided, and this means that, for example B and example C, different bearing manners may be adopted for fields in the second information and in the configuration information.

In an implementation, when the terminal device supports at least two composition manners of the receive beams or the receive beam groups, the second information indicates at least one of the followings: the composition manners of the receive beams or the receive beam groups supported by the terminal device, the number of the receive beams or the receive beam groups supported by the terminal device, or the number of the composition manners of the receive beams or the receive beam groups supported by the terminal device.

The terminal device receives fourth information sent by the network device. The fourth information is used to configure at least one of the followings for the terminal device: the composition manner of the receive beams or receive beam groups configured for signal quality feedback, the number of the composition manners of the receive beams or the receive beam groups supported by the terminal device, or the number of the receive beams or receive beam groups configured for the quality feedback.

The terminal device determines the first feedback manner according to the fourth information.

Specifically, assume that the terminal device supports only one receiving capability, and the terminal device reports K conditions supported by the terminal device for the receive beams or the receive beam groups to the network device. Each condition at least includes the receiving capability of the receive beams or the receive beam groups.

Furthermore, related report information of each condition may further include the following information:

a composition manner 1 of the receive beams or the receive beam groups and the number of the receive beams or the receive beam groups in the composition manner 1;

a composition manner 2 of the receive beams or the receive beam groups and the number of the receive beams or the receive beam groups in the composition manner 2;

. . .

a composition manner K of the receive beams or the receive beam groups and the number of the receive beams or the receive beam groups in the composition manner K.

The network device, after receiving the information reported by the terminal device, may configure the terminal device. The configuration information may include:

the receiving capability and the number of the receive beams or the receive beam groups; or the receiving capability and the serial number of the composition manner of the receive beams or the receive beam groups; or the number of the receive beams or the receive beam groups; or the serial number of the composition manner of the receive beams or the receive beam groups.

The terminal device, after the configuration information of the network device is received and the configuration is activated, may perform signal measurement and report the measurement report according to the configuration information.

In an implementation, when the terminal device supports one receiving capability of the receive beams or the receive beam groups and the terminal device supports one composition manner of the receive beams or the receive beam groups, the terminal device determines the first feedback manner according to the second information.

Specifically, assume that the terminal device supports only one receiving capability and supports only one composition manner, the terminal device reports one condition supported by the terminal device for the receive beams or the receive beam groups to the network device. This condition at least includes the receiving capability of the receive beams or the receive beam groups.

Furthermore, related report information of this condition may further include the following information: the composition manner of the receive beams or the receive beam groups and the number of the receive beams or the receive beam groups in the composition manner.

Since the terminal device supports only one condition, the network device may not configure the terminal device, and the terminal device may feed back the signal quality by adopting this condition as a default.

After receiving the information reported by the terminal device, the network device may also configure the terminal device. The configuration information may include:

the receiving capability and the number of the receive beams or the receive beam groups; or the receiving capability and the serial number of the composition manner of the receive beams or the receive beam groups; or the number of the receive beams or the receive beam groups; or the serial number of the composition manner of the receive beams or the receive beam groups.

The terminal device, after the configuration information of the network device is received and the configuration is activated, may perform signal measurement and report the measurement report according to the configuration information.

In an implementation, the second indication indicates at least one of: the composition manners of the receive beams or the receive beam groups supported by the terminal device, the number of the receive beams or the receive beam groups supported by the terminal device, or the number of the composition manners of the receive beams or the receive beam groups supported by the terminal device. The measurement report for feeding back the signal quality is further configured to indicate the receiving capabilities of the receive beams or the receive beam groups supported by the terminal device.

Specifically, assume that the terminal device reports K conditions supported by the terminal device for the receive beams or the receive beam groups to the network device. Each condition at least includes the following information:

the composition manner 1 of the receive beams or the receive beam groups and the number of the receive beams or the receive beam groups in the composition manner 1;

the composition manner 2 of the receive beams or the receive beam groups and the number of the receive beams or the receive beam groups in the composition manner 2;

. . .

the composition manner K of the receive beams or the receive beam groups and the number of the receive beams or the receive beam groups in the composition manner K.

The network device, after receiving the information reported by the terminal device, may configure the terminal device. The configuration information may include: the number of the receive beams or the receive beam groups; or the serial number of the composition manner of the receive beams or the receive beam groups.

The terminal device, after the configuration information of the network device is received and the configuration is activated, may perform signal measurement and report the measurement report according to the configuration information.

The measurement report reported by the terminal device may carry the receiving capability of a receive beam or receive beam group presently adopted for signal quality feedback.

In 220, the terminal device feeds back the signal quality to the network device according to the first feedback manner.

FIG. 5 is a schematic flowchart of a wireless communication method 300 according to an embodiment of the disclosure. As illustrated in FIG. 5, the method 300 includes the following contents.

In 310, a network device generates first information, and the first information is used to configure a feedback manner in which a terminal device feeds back signal quality of multiple transmit beams of the network device to the network device; the first information is used to configure at least one of the followings for the terminal device: a receiving capability of receive beams or receive beam groups configured for signal quality feedback, the number of the receive beams or receive beam groups configured for signal quality feedback, or a composition manner of the receive beams or receive beam groups configured for signal quality feedback, the composition manner being indexed to the number of the receive beam or receive beam groups configured for signal quality feedback.

In at least one embodiment, the receiving capability of the receive beams or the receive beam groups includes a first receiving capability or a second receiving capability.

In the first receiving capability, the same receive beam or the same receive beam group can simultaneously receive downlink signals sent by multiple transmit beams.

In the second receiving capability, different receive beams or different receive beam groups can simultaneously receive downlink signals sent by different transmit beams.

In at least one embodiment, before the network device generates the first information, the network device receives second information sent by the terminal device. The second information is configured to indicate at least one of: receiving capabilities of receive beams or receive beam groups supported by the terminal device, the number of the receive beams or the receive beam groups supported by the terminal device, composition manners of the receive beams or the receive beam groups supported by the terminal device, or the number of the composition manners of the receive beams or the receive beam groups supported by the terminal device.

In an implementation, the second information at least indicates the receiving capabilities of the receive beams or the receive beam groups supported by the terminal device, and the terminal device supports at least two receiving capabilities of the receive beams or the receive beam groups.

The first information is configured to at least configure the following for the terminal device: the receiving capability of the receive beams or receive beam groups configured for signal quality feedback.

In an implementation, the terminal device supports at least two composition manners of the receive beams or the receive beam groups, and the second information indicates at least one of the followings: the composition manners of the receive beams or the receive beam groups supported by the terminal device, the number of the receive beams or the receive beam groups supported by the terminal device, or the number of the composition manners of the receive beams or the receive beam groups supported by the terminal device.

The first information is configured to configure at least one of the followings for the terminal device: the composition manner for the receive beams configured for signal quality feedback, the number of the composition manners of the receive beams or the receive beam groups supported by the terminal device, or the number of the receive beams or receive beam groups configured for quality feedback.

In an implementation, the second information indicates at least one of: the composition manners of the receive beams or the receive beam groups supported by the terminal device, the number of the receive beams or the receive beam groups supported by the terminal device, or the number of the composition manners of the receive beams or the receive beam groups supported by the terminal device.

A measurement report for feeding back the signal quality is further configured to indicate the receiving capabilities of the receive beams or the receive beam groups supported by the terminal device.

In at least one embodiment, the network device receives a message carrying capability information of the terminal device from the terminal device. The capability information includes the second information.

In 320, the network device sends the first information to the terminal device.

In at least one embodiment of the disclosure, the network device determines a first feedback manner for signal quality feedback of the terminal device. The first feedback manner is different from another feedback manner supported by the terminal device in at least one of: the receiving capability of the receive beams or receive beam groups configured for signal quality feedback, or the number of the receive beams or receive beam groups configured for signal quality feedback.

The network device determines a transmit beam for sending a downlink signal to the terminal device according to the first feedback manner and the fed-back measurement report for the signal quality.

The downlink signal is sent via the determined transmit beam.

In the embodiments of the disclosure, the terminal device may determine the first feedback manner for feeding back the signal quality of the multiple transmit beams of the network device in multiple feedback manners, and feeds back the signal quality to the network device according to the first feedback manner. In such a manner, the terminal device may support the multiple feedback manners, and the terminal device may select a presently-used feedback manner in the multiple feedback manners according to a requirement.

FIG. 6 is a schematic block diagram of a terminal device 400 according to an embodiment of the disclosure. As illustrated in FIG. 6, the terminal device 400 includes a processing unit 410 and a transceiver unit 420.

The processing unit 410 is configured to determine a first feedback manner for feeding back signal quality of multiple transmit beams of a network device. The first feedback manner is different from another feedback manner supported by the terminal device in at least one of: a receiving capability of receive beams or receive beam groups configured for signal quality feedback, or the number of the receive beams or receive beam groups configured for signal quality feedback.

The transceiver unit 420 is configured to feed back the signal quality to the network device according to the first feedback manner.

In at least one embodiment, the receiving capability of the receive beams or the receive beam groups includes at least one of a first receiving capability or a second receiving capability.

In the first receiving capability, the same receive beam or the same receive beam group can simultaneously receive downlink signals sent by multiple transmit beams.

In the second receiving capability, different receive beams or different receive beam groups can simultaneously receive downlink signals sent by different transmit beams.

In at least one embodiment, the transceiver unit 420 is further configured to: receive first information sent by the network device. The first information is used to configure at least one of the followings for the terminal device: the receiving capability of the receive beams or receive beam groups configured for signal quality feedback, the number of the receive beams or receive beam groups configured for signal quality feedback, or a composition manner of the receive beams or receive beam groups configured for signal quality feedback. The composition manner is indexed to the number of the receive beam or receive beam groups configured for signal quality feedback.

The processing unit 410 is further configured to: determine the first feedback manner according to the first information.

In at least one embodiment, the transceiver unit 420 is further configured to: send second information to the network device. The second information is configured to indicate at least one of: receiving capabilities of receive beams or receive beam groups supported by the terminal device, the number of the receive beams or the receive beam groups supported by the terminal device, composition manners of the receive beams or the receive beam groups supported by the terminal device, or the number of the composition manners of the receive beams or the receive beam groups supported by the terminal device. Each of the composition manners is indexed to the number of the receive beams or receive beam groups configured for signal quality feedback.

In at least one embodiment, when the terminal device supports at least two receiving capabilities of the receive beams or the receive beam groups, the second information at least indicates the receiving capabilities of the receive beams or the receive beam groups supported by the terminal device.

The transceiver unit 420 is further configured to: receive third information sent by the network device. The third information is used to at least configure the following for the terminal device: the receiving capability of the receive beams or receive beam groups configured for signal quality feedback.

The processing unit 410 is further configured to determine the first feedback manner according to the third information.

In at least one embodiment, when the terminal device supports at least two composition manners of the receive beams or the receive beam groups, the second information at least indicates at least one of the followings: the composition manners of the receive beams or the receive beam groups supported by the terminal device, the number of the receive beams or the receive beam groups supported by the terminal device, or the number of the composition manners of the receive beams or the receive beam groups supported by the terminal device.

The transceiver unit 420 is further configured to receive fourth information sent by the network device. The fourth information is used to configure at least one of the followings for the terminal device: the composition manner of the receive beams or receive beam groups configured for signal quality feedback, the number of the composition manners of the receive beams or the receive beam groups supported by the terminal device, or the number of the receive beams or receive beam groups configured for quality feedback.

The processing unit 410 is further configured to determine the first feedback manner according to the fourth information.

In at least one embodiment, when the terminal device supports one receiving capability of the receive beams or the receive beam groups and the terminal device supports one composition manner of the receive beams or the receive beam groups, the processing unit 410 is further configured to determine the first feedback manner according to the second information.

In at least one embodiment, the second information indicates at least one of: the composition manners of the receive beams or the receive beam groups supported by the terminal device, the number of the receive beams or the receive beam groups supported by the terminal device, or the number of the composition manners of the receive beams or the receive beam groups supported by the terminal device.

A measurement report for feeding back the signal quality is further configured to indicate the receiving capabilities of the receive beams or the receive beam groups supported by the terminal device.

In at least one embodiment, the transceiver unit 420 is further configured to send a message carrying capability information of the terminal device to the network device, and the capability information includes the second information.

It is to be understood that the terminal device 400 may correspond to the terminal device in the method 200, may implement functions implemented by the terminal device in the method 200 and, which will not be elaborated herein for simplicity.

Figure 7:
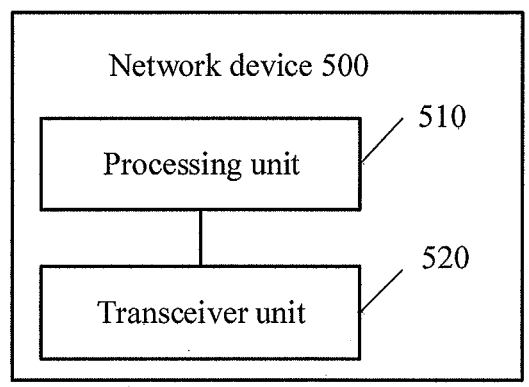
FIG. 7 is a schematic block diagram of a network device according to an embodiment of the disclosure.

FIG. 7 is a schematic block diagram of a network device 500 according to an embodiment of the disclosure. As illustrated in FIG. 7, the network device 500 includes a processing unit 510 and a transceiver unit 520.

The processing unit 510 is further configured to generate first information, and the first information is used to configure a feedback manner in which a terminal device feeds back signal quality of multiple transmit beams of the network device to the network device. The first information is used to configure at least one of the followings for the terminal device: a receiving capability of receive beams or receive beam groups configured for signal quality feedback, the number of the receive beams or receive beam groups configured for signal quality feedback, or a composition manner of the receive beams or receive beam groups configured for signal quality feedback. The composition manner is indexed to the number of the receive beam or receive beam groups configured for signal quality feedback.

The transceiver unit 520 is further configured to send the first information to the terminal device.

In at least one embodiment, the receiving capability of the receive beams or the receive beam groups includes at least one of a first receiving capability or a second receiving capability.

In the first receiving capability, the same receive beam or the same receive beam group can simultaneously receive downlink signals sent by multiple transmit beams.

In the second receiving capability, different receive beams or different receive beam groups can simultaneously receive downlink signals sent by different transmit beams.

In at least one embodiment, the transceiver unit 520 is further configured to receive second information sent by the terminal device. The second information is configured to indicate at least one of: receiving capabilities of receive beams or receive beam groups supported by the terminal device, the number of the receive beams or the receive beam groups supported by the terminal device, composition manners of the receive beams or the receive beam groups supported by the terminal device, or the number of the composition manners of the receive beams or the receive beam groups supported by the terminal device.

In at least one embodiment, the second information at least indicates the receiving capabilities of the receive beams or the receive beam groups supported by the terminal device, and the terminal device supports at least two receiving capabilities of the receive beams or the receive beam groups.

The first information is configured to at least configure the following for the terminal device: the receiving capability of the receive beams or receive beam groups configured for signal quality feedback.

In at least one embodiment, the terminal device supports at least two composition manners of the receive beams or the receive beam groups, and the second information indicates at least one of the followings: the composition manners of the receive beams or the receive beam groups supported by the terminal device, the number of the receive beams or the receive beam groups supported by the terminal device, or the number of the composition manners of the receive beams or the receive beam groups supported by the terminal device.

The first information is used to configure at least one of the followings for the terminal device: the composition manner of the receive beams configured for signal quality feedback, the number of the composition manners of the receive beams or the receive beam groups supported by the terminal device, or the number of the receive beams or receive beam groups configured for quality feedback.

In at least one embodiment, the second information indicates at least one of: the composition manners of the receive beams or the receive beam groups supported by the terminal device, the number of the receive beams or the receive beam groups supported by the terminal device, or the number of the composition manners of the receive beams or the receive beam groups supported by the terminal device.

A measurement report for feeding back the signal quality is further configured to indicate the receiving capabilities of the receive beams or the receive beam groups supported by the terminal device.

In at least one embodiment, the transceiver unit 520 is further configured to receive a message carrying capability information of the terminal device from the terminal device. The capability information includes the second information.

In at least one embodiment, the processing unit 510 is further configured to determine a first feedback manner for signal quality feedback of the terminal device, and the first feedback manner is different from another feedback manner supported by the terminal device in at least one of: the receiving capability of the receive beams or receive beam groups configured for signal quality feedback, the number of the receive beams or receive beam groups configured for signal quality feedback; and determine a transmit beam for sending a downlink signal to the terminal device according to the first feedback manner and the fed-back measurement report for the signal quality.

The transceiver unit 520 is further configured to send the downlink signal via the determined transmit beam.

It is to be understood that the network device 500 may correspond to the network device in the method 300, may realize corresponding functions realized by the network device in the method 300, which will not be elaborated herein for simplicity.

Figure 8:
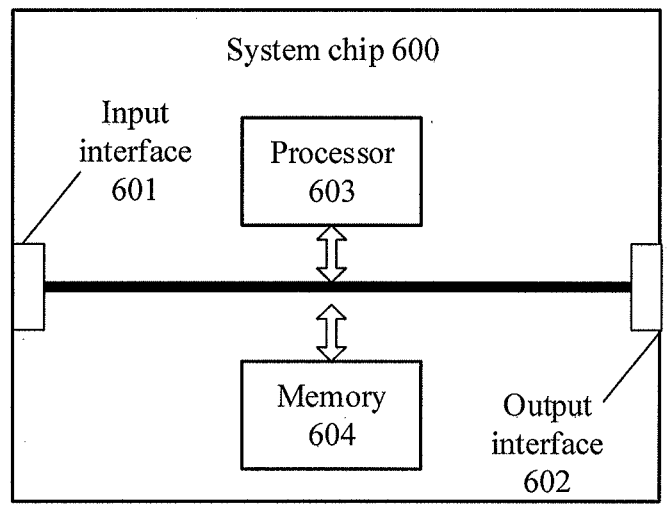
FIG. 8 is a schematic block diagram of a system chip according to an embodiment of the disclosure.

FIG. 8 is a schematic structure diagram of a system chip 600 according to an embodiment of the disclosure. The system chip 600 in FIG. 8 includes an input interface 601, an output interface 602, a processor 603 and a memory 604, all of which may be connected through an internal communication connecting line. The processor 603 is configured to execute a code in the memory 704.

In at least one embodiment, when the code is executed, the processor 603 implements the operations executed by the terminal device in the method 200 illustrated in FIG. 2. For simplicity, no more elaborations will be made herein.

In at least one embodiment, when the code is executed, the processor 603 implements the operations executed by the network device in the method 300 illustrated in FIG. 3. For simplicity, no more elaborations will be made herein.

Figure 9:
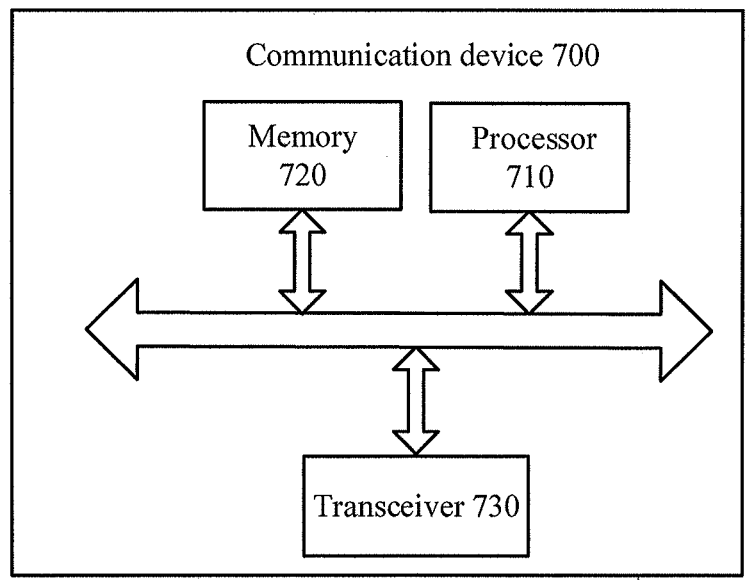
FIG. 9 is a schematic block diagram of a communication device according to an embodiment of the disclosure.

FIG. 9 is a schematic block diagram of a communication device 700 according to an embodiment of the disclosure. As illustrated in FIG. 9, the communication device 700 includes a processor 710 and a memory 720. The memory 720 may store a program code, and the processor 710 may execute the program code stored in the memory 720.

In at least one embodiment, as illustrated in FIG. 8, the communication device 700 may include a transceiver 730. The processor 710 may control the transceiver 730 for external communication.

In at least one embodiment, the processor 710 may call the program code stored in the memory 720 to execute corresponding operations of the terminal device in the method 200 illustrated in FIG. 2. For similarity, no more elaborations will be made herein.

In at least one embodiment, the processor 710 may call the program code stored in the memory 720 to execute corresponding operations of the network device in the method 300 illustrated in FIG. 2. For similarity, no more elaborations will be made herein.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the disclosure. The abovementioned storage medium includes: various media capable of storing program codes such as a U disk, a mobile hard disk, a Read-Only Memory (ROM), a Random Access Memory (RAM), a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A wireless communication method, comprising:
   determining, by a terminal device, a first feedback manner for feeding back signal quality of multiple transmit beams of a network device, the first feedback manner being different from another feedback manner supported by the terminal device in at least one of:
   a receiving capability of receive beams or receive beam groups configured for signal quality feedback, or a number of the receive beams or receive beam groups configured for the signal quality feedback; and
   feeding back, by the terminal device, the signal quality to the network device according to the first feedback manner;
   wherein before determining, by the terminal device, the first feedback manner for feeding back the signal quality of the multiple transmit beams of the network device, further comprising:
   sending, by the terminal device, first information to the network device, the first information being configured to indicate at least one of:
   receiving capabilities of receive beams or receive beam groups supported by the terminal device, a number of the receive beams or the receive beam groups supported by the terminal device, composition manners of the receive beams or the receive beam groups supported by the terminal device, or a number of the composition manners of the receive beams or the receive beam groups supported by the terminal device, each composition manner being indexed to the number of the receive beams or receive beam groups configured for the signal quality feedback;
   wherein when the terminal device supports at least two receiving capabilities of the receive beams or the receive beam groups, the first information at least indicates the receiving capabilities of the receive beams or the receive beam groups supported by the terminal device;
   the method further comprises:
   receiving, by the terminal device, second information sent by the network device, wherein the second information is to at least configure the following for the terminal device: the receiving capability of the receive beams or receive beam groups configured for the signal quality feedback; and
   determining, by the terminal device, the first feedback manner for feeding back the signal quality of the multiple transmit beams of the network device comprises:
   determining the first feedback manner according to the second information; or
   wherein when the terminal device supports at least two composition manners of the receive beams or the receive beam groups, the first information indicates at least one of the followings: the composition manners of the receive beams or the receive beam groups supported by the terminal device, the number of the receive beams or the receive beam groups supported by the terminal device, or the number of the composition manners of the receive beams or the receive beam groups supported by the terminal device;
   the method further comprises:
   receiving, by the terminal device, third information sent by the network device, wherein the third information is to configure at least one of the followings for the terminal device: the composition manner of the receive beams or receive beam groups configured for the signal quality feedback, the number of the composition manners of the receive beams or the receive beam groups supported by the terminal device, or the number of the receive beams or receive beam groups configured for the signal quality feedback; and
   determining, by the terminal device, the first feedback manner for feeding back the signal quality of the multiple transmit beams of the network device comprises:
   determining the first feedback manner according to the third information.

2. The method of claim 1, wherein the receiving capability of the receive beams or the receive beam groups comprises at least one of a first receiving capability or a second receiving capacity;
   in the first receiving capability, the same receive beam or the same receive beam group is capable of simultaneously receiving downlink signals sent by multiple transmit beams; and
   in the second receiving capability, different receive beams or different receive beam are capable of simultaneously receiving downlink signals sent by different transmit beams.

3. The method of claim 1, wherein sending, by the terminal device, the first information to the network device comprises:
   sending, by the terminal device, a message carrying capability information of the terminal device to the network device, the capability information comprising the first information.

4. A terminal device, comprising a processor and a transceiver, wherein
   the processor is configured to determine a first feedback manner for feeding back signal quality of multiple transmit beams of a network device, the first feedback manner being different from another feedback manner supported by the terminal device in at least one of:
a receiving capability of receive beams or receive beam groups configured for signal quality feedback, or a number of the receive beams or receive beam groups configured for the signal quality feedback; and
the transceiver is configured to feed back the signal quality to the network device according to the first feedback manner;
wherein the transceiver is further configured to:
send first information to the network device, the first information being configured to indicate at least one of:
receiving capabilities of receive beams or receive beam groups supported by the terminal device, a number of the receive beams or the receive beam groups supported by the terminal device, composition manners of the receive beams or the receive beam groups supported by the terminal device, or a number of the composition manners of the receive beams or the receive beam groups supported by the terminal device, each composition manners being indexed to the number of the receive beams or receive beam groups configured for the signal quality feedback;
wherein when the terminal device supports at least two receiving capabilities of the receive beams or the receive beam groups, the first information at least indicates the receiving capabilities of the receive beams or the receive beam groups supported by the terminal device;
the transceiver is further configured to:
receive second information sent by the network device, wherein the second information is to at least configure the following for the terminal device: the receiving capability of the receive beams or receive beam groups configured for the signal quality feedback; and
the processor is further configured to:
determine the first feedback manner according to the second information; or
wherein when the terminal device supports at least two composition manners of the receive beams or the receive beam groups, the first information indicates at least one of the followings: the composition manners of the receive beams or the receive beam groups supported by the terminal device, the number of the receive beams or the receive beam groups supported by the terminal device, or the number of the composition manners of the receive beams or the receive beam groups supported by the terminal device;
the transceiver is further configured to:
receive third information sent by the network device, wherein the third information is to configure at least one of the followings for the terminal device: the composition manner of the receive beams or receive beam groups configured for the signal quality feedback, the number of the composition manners of the receive beams or the receive beam groups supported by the terminal device, or the number of the receive beams or receive beam groups configured for the signal quality feedback; and
the processor is further configured to:
determine the first feedback manner according to the third information.

5. The terminal device of claim 4, wherein the receiving capability of the receive beams or the receive beam groups comprises at least one of a first receiving capability or a second receiving capacity;

in the first receiving capability, the same receive beam or the same receive beam group is capable of simultaneously receiving downlink signals sent by multiple transmit beams; and
in the second receiving capability, different receive beams or different receive beam groups are capable of simultaneously receiving downlink signals sent by different transmit beams.

6. The terminal device of claim 4, wherein the first information indicates at least one of: the composition manners of the receive beams or the receive beam groups supported by the terminal device, the number of the receive beams or the receive beam groups supported by the terminal device, or the number of the composition manners of the receive beams or the receive beam groups supported by the terminal device.

7. The terminal device of claim 4, wherein the transceiver is further configured to:
send a message carrying capability information of the terminal device to the network device, the capability information comprising the first information.

8. The terminal device of claim 6, wherein the transceiver is further configured to:
sending, by the terminal device, a measurement report for feeding back the signal quality to the network device, wherein the measurement report is configured to indicate the receiving capabilities of the receive beams or the receive beam groups supported by the terminal device.

9. A network device, comprising a processor and a transceiver, wherein
the processor is further configured to generate first information, wherein the first information is to configure a feedback manner in which a terminal device feeds back signal quality of multiple transmit beams of the network device to the network device and the first information is to configure at least one of the followings for the terminal device:
a receiving capability of receive beams or receive beam groups configured for signal quality feedback, a number of the receive beams or receive beam groups configured for the signal quality feedback, or a composition manner of the receive beams or receive beam groups configured for the signal quality feedback, the composition manner being indexed to the number of the receive beam or receive beam groups configured for the signal quality feedback; and
the transceiver is further configured to send the first information to the terminal device;
wherein the transceiver unit is further configured to:
receive first information sent by the terminal device, the first information being configured to indicate at least one of:
receiving capabilities of receive beams or receive beam groups supported by the terminal device, a number of the receive beams or the receive beam groups supported by the terminal device, composition manners of the receive beams or the receive beam groups supported by the terminal device, or a number of the composition manners of the receive beams or the receive beam groups supported by the terminal device, each composition manners being indexed to the number of the receive beams or receive beam groups configured for the signal quality feedback;
wherein when the first information at least indicates the receiving capabilities of the receive beams or the receive beam groups supported by the terminal device, and the terminal device supports at least two receiving capabilities of the receive beams or the receive beam groups; the transceiver is further configured to:

send second information to the terminal device, wherein the second information is configured to at least configure the following for the terminal device: the receiving capability of the receive beams or receive beam groups configured for the signal quality feedback; or wherein when the composition manners of the receive beams or the receive beam groups supported by the terminal device comprise at least two composition manners, and the first information indicates at least one of the followings: the composition manners of the receive beams or the receive beam groups supported by the terminal device, the number of the receive beams or the receive beam groups supported by the terminal device, or the number of the composition manners of the receive beams or the receive beam groups supported by the terminal device; the transceiver is further configured to:

send third information to the terminal device, wherein the third information is to configure at least one of the followings for the terminal device: the composition manner of the receive beams configured for the signal quality feedback, the number of the composition manners of the receive beams or the receive beam groups supported by the terminal device, or the number of the receive beams or receive beam groups configured for quality feedback.

10. The network device of claim 9, wherein the processor is further configured to determine a first feedback manner for the signal quality feedback of the terminal device, the first feedback manner being different from another feedback manner supported by the terminal device in at least one of:

the receiving capability of the receive beams or receive beam groups configured for the signal quality feedback, or the number of the receive beams or receive beam groups configured for the signal quality feedback, and determine a transmit beam for sending a downlink signal to the terminal device according to the first feedback manner and a measurement report for the signal quality fed back by the terminal device; and the transceiver is further configured to send the downlink signal via the determined transmit beam.

* * * * *